United States Patent [19]

DeHaan et al.

[11] Patent Number: 4,494,598
[45] Date of Patent: Jan. 22, 1985

[54] FLUE PIPE CONNECTION ASSEMBLY AND METHOD OF CONNECTION THEREOF

[75] Inventors: Robert DeHaan, Cedar Rapids; Lee D. Gisvold, Norway, both of Iowa

[73] Assignee: Amana Refrigeration, Inc., Amana, Iowa

[21] Appl. No.: 456,171

[22] Filed: Jan. 6, 1983

[51] Int. Cl.³ .............................................. F28F 9/06
[52] U.S. Cl. .................................... 165/47; 165/178; 165/DIG. 2; 285/305
[58] Field of Search ................. 165/178, 47, DIG. 2, 165/DIG. 8; 237/55

[56] References Cited

U.S. PATENT DOCUMENTS

| | | | |
|---|---|---|---|
| 3,560,027 | 2/1971 | Graham | 285/150 |
| 3,768,844 | 10/1973 | Goward et al. | 285/137 R |
| 3,929,356 | 12/1975 | DeVincent et al. | 285/305 |
| 4,103,735 | 8/1978 | Warner | 237/55 X |
| 4,164,210 | 8/1979 | Hollowell | 237/55 X |
| 4,304,297 | 12/1981 | Margraf | 165/178 X |
| 4,314,444 | 2/1982 | Putnam et al. | 60/39.77 |

FOREIGN PATENT DOCUMENTS 2930577  2/1981  Fed. Rep. of Germany ... 165/DIG. 8

Primary Examiner—Michael Koczo
Attorney, Agent, or Firm—William R. Clark; Joseph D. Pannone

[57] ABSTRACT

A coupling between a stainless steel exhaust manifold of a recuperative heat exchanger and a plastic flue pipe. The internal integrity of the manifold is maintained by spot welding a mounting bracket to the outside thereby defining a slot between parallel portions of the bracket and the manifold. The flue pipe inserts through coaxial circular apertures in the bracket and the manifold. A shoulder of an annular protrusion on the outside of the flue pipe presses against an O-ring seated in an inwardly directed step of the circular aperture in the manifold thereby providing an airtight seal. The flue pipe is secured in the described position by a bifurcated retainer clip slid down into the slot thereby engaging portions of the opposite shoulder of the annular protrusion.

9 Claims, 8 Drawing Figures

FLUE PIPE CONNECTION ASSEMBLY AND METHOD OF CONNECTION THEREOF

BACKGROUND OF THE INVENTION

Recuperative furnaces are well known in the art. They are also known as condensing furnaces. They are distinguished from conventional or non-condensing furnaces by their recovery of a portion of the latent, as well as sensible, heat of the water vapor formed in the combustion process.

Non-condensing furnaces exhaust flue or vent gases at temperatures up to 550° F. As a result, such furnaces produce flue gases in which the water generated by the combustion process remains in the gaseous state; the latent heat of vaporization is not recovered. The efficiency of a furnace which operates in a non-condensing mode generally has a maximum in the range from 75 to 85 percent. On a seasonal basis, this efficiency is reduced because usable heat is also lost up the chimney through a draft hood during the cool-down period at the end of each heating cycle.

Recuperative furnaces, on the other hand, do not employ draft hoods. The flue products are cooled to the dew point while still in the appliance, and some of the latent heat of vaporization is recovered as usable energy. This results in substantially higher efficiencies as less energy is lost out the flue. Vent gas temperatures may be as low as 100° F. and there are few, if any, off cycle losses. Accordingly, depending on the type of condensing or recuperative furnace, efficiencies can be in the low to high 90 percent range.

The condensate produced by a recuperative furnace has a typical pH range of two to six: it is mildly acidic and potentially corrosive. By contrast, normal household waste water tends to be slightly alkaline. Its pH runs on the high side of seven.

The primary difference between the environment in a condensing or recuperative heat exchanger furnace and a conventional furnace is the presence of liquid water. The various gases in the flue gas dissolve in this water to form such acids as carbonic, sulfurous, sulfuric, nitric and nitrous. Dissolved oxygen and carbon monoxide are also present. The acid gases lower the pH of the water and promote acid corrosive attack. The combination of carbon monoxide and carbon dioxide may produce stress corrosion attacking some materials of construction as well. Likewise, sulfurous acid has been shown to promote stress corrosion cracking and intergranular attack of some materials.

In the above-described environment, the use of a plastic, such as polyvinylcloride (PVC), for the flue pipe provides advantages. More specifically, PVC is resistant to the reduced flue gas temperatures which may be in the range from 100° F. to 120° F. Also, PVC is substantially impervious to corrosion from the mildly acidic conditions. Furthermore, PVC is considered easy to work with. Also, PVC is generally a less expensive material than metals that could be used for the flue pipe.

The use of a PVC flue pipe, however, presents a set of particular design parameters or objectives for the connection to a stainless steel exhaust manifold on the recuperative heat exchanger. For example, it is important to maintain internal integrity of the exhaust manifold because holes in it and conventional fasteners such as bolts penetrating through them would be subjected to the mildly acidic environment. Furthermore, it is important that the furnace be as modular as possible so that parts can be disassembled for inspection and/or replacement as necessary. More specifically, as with other parts of the furnace, it is desirable to be able to remove the flue pipe to inspect the interior of the exhaust manifold and take corrective maintenance such as, for example, removing a blockage from the condensate drain and flush system to be described later herein. Also, the junction between the manifold and the PVC flue pipe should provide an airtight seal to prevent the escape of fumes and gases into the furnace room.

SUMMARY OF THE INVENTION

The primary objective of the invention is to provide a coupling between a plastic flue pipe and a stainless steel exhaust manifold of a recuperative furnace.

It is an object of the invention to provide an airtight seal between the manifold and the plastic flue pipe.

Another object is to provide a coupling assembly that maintains the internal integrity of the exhaust manifold so as to minimize the effects of the mildly acidic environment within the manifold.

Still another object is to provide a coupling assembly that can be readily disassembled for inspection or maintenance.

These and other objects and advantages are provided by the invention which discloses the combination of a recuperative heat exchanger for extracting heat from flue gases, the exchanger having a metallic exhaust manifold having a flat surface with a circular aperture, a bracket connected to the manifold defining a plate parallelly spaced from the surface of the manifold, the plate having a circular opening coaxial to the aperture, the opening being larger than the aperture, a plastic pipe extending through the opening and into the manifold through the aperture, the pipe having an annular protrusion defining a first shoulder facing the manifold and a second shoulder facing away from the manifold, an O-ring positioned around the pipe, the O-ring being pressed between the first shoulder and the surface of the manifold to form a substantially airtight seal therebetween, and a bifurcated retainer removably inserted between the surface and the plate, the retainer engaging the second shoulder to prevent motion of the pipe away from the manifold. It may be preferable that the heat exchanger comprise tubes surrounded by fins, the exhaust end of the tubes communicating with the exhaust manifold. Also, the bracket may preferably be spot welded to the manifold. Further, the plastic pipe may be PVC and the O-ring may be Viton. The aperture may have an inwardly directed step to seat the O-ring.

The invention may also be practiced by an exhaust assembly for a recuperative furnace, comprising a tube and fin recuperative heat exchanger for extracting heat from the products of combustion and for recovering latent heat of vaporization from the products of combustion by condensation within the tubes, a metallic manifold coupled to the exhaust ends of tubes and having a substantially planar external surface with an inwardly stepped circular aperture, elastic O-ring seated in the step of the stepped circular aperture, a bracket connected to the manifold, the bracket defining a plate parallelly spaced from the surface of the manifold, the plate having an aperture coaxial with the aperture in the surface of the manifold, a plastic pipe extending through the apertures in the plate and manifold, the pipe having an annular protrusion defining a first shoulder facing the manifold and a second shoulder facing away from the manifold, the first shoulder being pressed against the O-ring wherein a substantially airtight seal is formed, and a bifurcated retainer removably inserted between the plate and the surface, the retainer engaging the second shoulder preventing the pipe from moving in a perpendicular direction away from the manifold.

The invention also discloses the method of connecting a plastic flue pipe to a metal manifold of a recuperative heat exchanger of a residential furnace, comprising the steps of inserting the plastic flue pipe through a first circular aperture in a bracket plate parallelly spaced from an outer surface of the manifold and through a second circular aperture in the surface, the first and second apertures being coaxial, the pipe having an annular protrusion having a circumference larger than the second aperture but smaller than the first aperture, the protrusion defining a first shoulder facing the manifold and a second shoulder facing away from the manifold, pressing the pipe inwardly toward the manifold to compress an elastic O-ring between the first shoulder and the surface of the manifold to form an airtight seal, and inserting a bifurcated retainer between the plate and the surface of the manifold, the retainer engaging the second shoulder to prevent movement of the pipe in a direction perpendicular away from the manifold.

BRIEF DESCRIPTION OF THE DRAWINGS

The foregoing and other objects and advantages of the invention will be more readily understood by reading the Description of the Preferred Embodiment wherein.

DESCRIPTION OF THE PREFERRED EMBODIMENT

Figure 1:
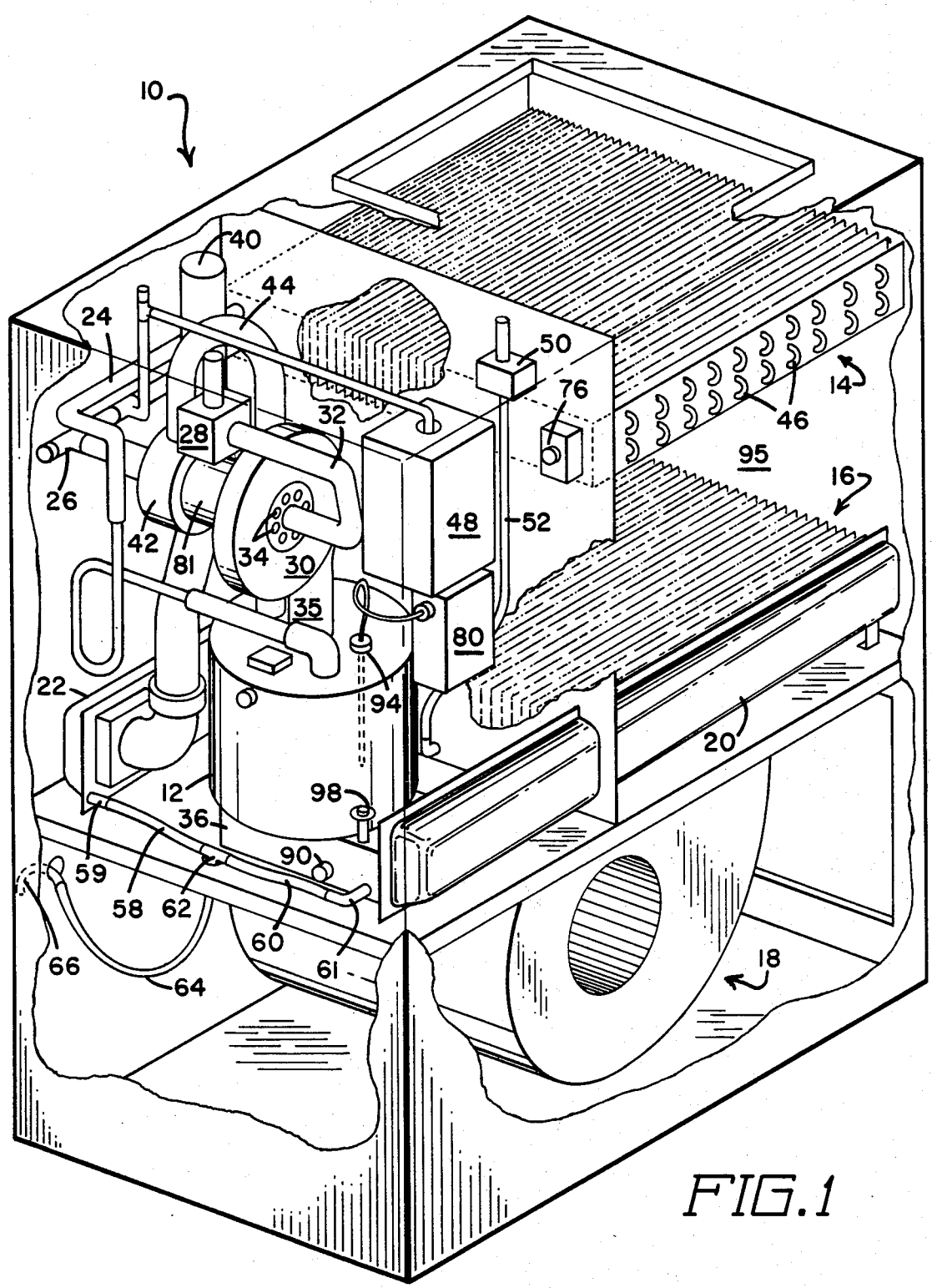
FIG. 1 is an illustrative, partially broken away perspective view of a recuperative furnace embodying the invention.

Referring now to the drawings, wherein like numerals refer to the like parts, and more particularly to FIG. 1, there is shown in a partially broken away, perspective view a recuperative furnace 10. Furnace 10 is broadly made up of a burner and heat exchange module 12, a secondary heat exchanger 14, a recuperative heat exchanger 16 and a blower assembly 18. Module 12 is connected to recuperative heat exchanger or recuperator 16 by conduit 36 and manifold 20. Module 12 is connected to secondary heat exchanger 14 by solution lines 24 and 26.

Figure 2:
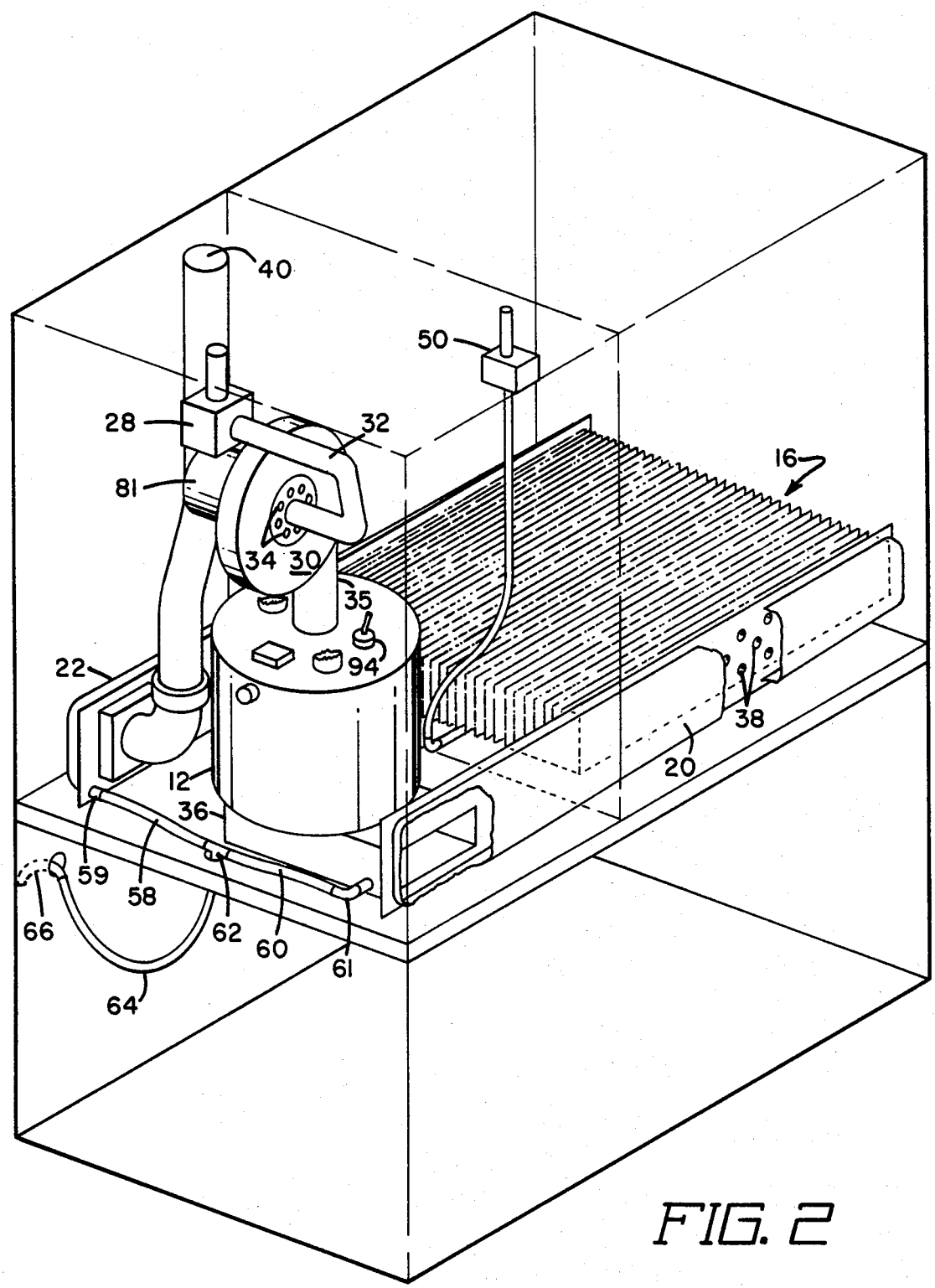
FIG. 2 is a perspective view of FIG. 1 with some of the parts omitted thereby illustrating the recuperative heat exchanger and associated water flushing system.

The flow of fuel and flue gases may best be seen in FIG. 2 wherein, for illustration, the view of FIG. 1 is shown with some of the parts omitted. Upon a call for heat and in accordance with the controls of the furnace as will be described in detail later herein with particular reference to FIG. 7, electricity flows through a ceramic ignitor tip (not shown) heating it to approximately 2,500° F. Then, combustion air blower 30 is activated and fuel valve 28 is opened. Blower 30 mixes a gas and air mixture with the gas being provided from conduit 32 running from valve 28 and the air being supplied through apertures 34. From blower 30, the air and fuel mixture is forced via duct 35 into module 12. As the mixture passes over the hot ignitor tip, ignition occurs and combustion begins. The detailed construction of module 12 and secondary heat exchanger 14 and their related operation may be fully understood from U.S. Pat. Nos. 3,936,003; 3,967,590; 3,997,109, 4,135,487 and 4,171,772, which are hereby incorporated by reference.

The products of combustion are exhausted downwardly from module 12 into conduit 36. In fact, module 12 is inverted from what may heretofore have been considered its standard configuration. The combustion by-products travel along manifold 20 and into tubes 38 within recuperator 16. Recuperator 16 is of fin and tube construction as is well known in the art.

Within tubes 38, the combustion by-products are partially condensed and accordingly, part of the latent heat of water vapor is recovered. The remaining gases flow out tubes 38 and into manifold 22. From manifold 22, the gases are exhausted from the furnace through vent pipe 40. The flue gases may then be exhausted from the home or other enclosure in much the same fashion as conventional furnaces or even conventional laundry equipment, i.e., there is no need for extensive chimneys or the like since the exhaust temperatures are typically in the range of 100° to 120° F.

Figure 3:
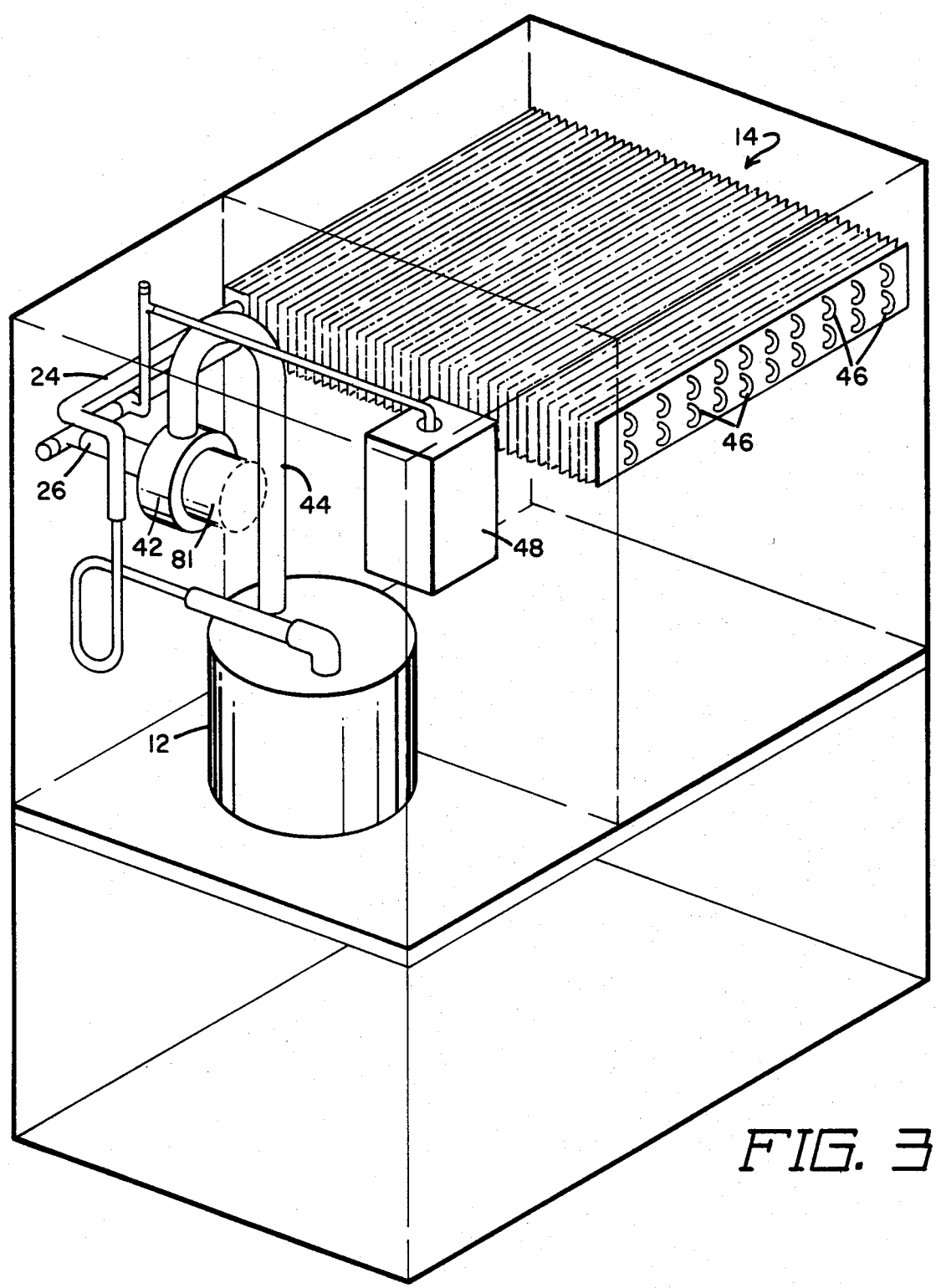
FIG. 3 is a perspective view of FIG. 1 with some of the parts omitted thereby illustrating the closed loop for a solution between the primary and secondary heat exchangers.

Turning now to FIG. 3, wherein, for illustration, the view of FIG. 1 is shown with some of the parts omitted, the flow of the primary heat exchange medium will be described. Upon a call for heat and in accordance with the controls of the furnace as will be described in detail later herein with particular reference to FIG. 7, solution pump 42 is activated. Pump 42 is connected at its inlet to line 26 which communicates with tubes 46 of secondary heat exchanger 14. At its outlet, pump 42 is connected by line 44 to module 12. Line 44 communicates with tubes (not shown) passing through module 12 and the closed loop back to tubes 46 of the secondary heat exchanger is completed by line 24. As is well known in the art, in conjunction with lines 24, 26, and 44, a solution such as ethylene or propylene glycol and water is circulated in a closed loop between module 12 which is considered the primary heat exchanger and secondary heat exchanger 14. Heat which is added to the solution by combustion within module 12 is given off in the secondary heat exchanger.

If for any reason the furnace malfunctions or exceeds its temperature limits or the solution expands beyond the capacity of the closed loop between module 12 and secondary heat exchanger 14, the solution overflows to atmospheric overflow tank 48 which functions in a similar manner to the overflow tanks that are in common use in many automobile radiator systems. In general, tank 48 acts as a reserve to accommodate any excess solution volume such as may be caused by thermal expansion.

As mentioned earlier herein, a condensate is formed in the recuperative heat exchanger or recuperator 16 as the combustion by-products cool therein. The removal and flushing of such condensate to overcome the problem of corrosion is best described with reference to FIGS. 2, 4, 5 and 6. Firing continuously, recuperative heat exchanger 16 may yield approximately three quarts of condensate per hour which corresponds to a substantial amount of recuperated latent heat of vaporization. Tubes 38 of recuperator 16 may be sloped downwardly towards respective manifolds 20 and 22 so as to accelerate the drainage of condensate. Further, manifolds 20 and 22 may be attached with a downward slope towards the front of furnace 10 so that condensate will rapidly drain towards lines 58 and 60, respectively, as shown best in FIG. 4. Lines 58 and 60 are joined at junction 62 so that liquid from respective manifolds 20 and 22 flows out of furnace 10 through trap 64. The condensate is removed from furnace 10 through elbow 66 which is connected to trap 64. The height of elbow 66 from the base of furnace 10 is important. If it is lower than the low point in trap 64, lines 58 and 60 and trap 64 will totally drain. If this happened, uncondensed flue gases remaining in manifold 22 would have an alternate path to the outside. Instead of being exhausted out vent pipe 40, the flue gases could escape through elbow 66. The result could be an accumulation of undesirable gases within the enclosure to be heated. If, on the other hand, elbow 66 is placed higher than drain 61, the diluted condensate will not properly drain from furnace 10, and manifolds 20 and 22 will retain excess liquid, restricting their volume and thereby affecting their performance. The most convenient means of disposal of the condensate from elbow 66 is in the domestic sanitary drain system where hundreds of gallons of waste water flow each day. Under normal conditions, the mildly acidic condensate is diluted and buffered by the normal sanitary system effluent.

Figure 5:
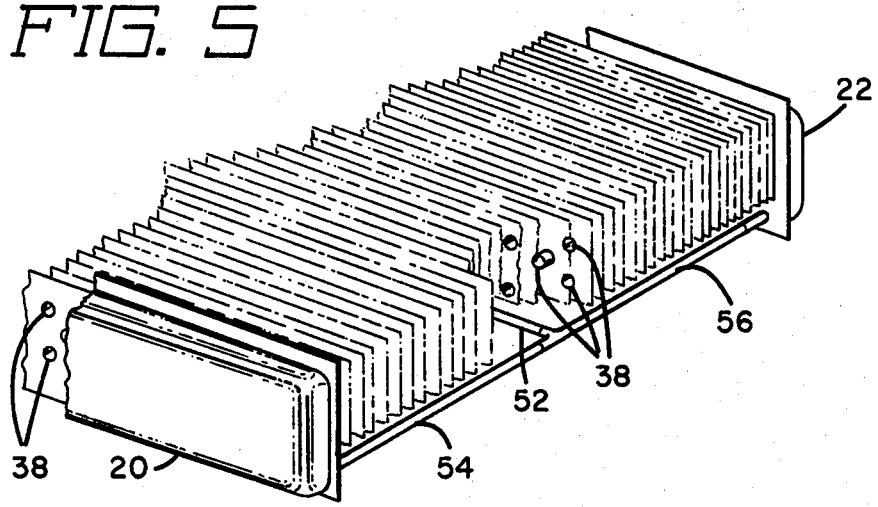
FIG. 5 is a rear perspective, partially broken out view of the recuperative heat exchanger and related condensate draining and water flushing system.

Manifolds 20 and 22 and tubes 38 are fabricated of stainless steel to resist corrosion by the mildly acidic condensate. Furthermore, at the end of each heating cycle, fresh water is flushed through the manifolds and out the drain to wash away residual condensate. More specifically, referring first to FIG. 2, a source of tap water is connected to water valve 50. Upon a call for water after a heating cycle as will be described in more detail later herein, water flows through line 52 down and underneath to the rear of recuperator 16 as shown in FIG. 5. At the rear of recuperator 16, line 52 branches into lines 54 and 56. Line 54 supplies water to manifold 20. Line 56 supplies water to manifold 22. The flushing water containing diluted residual condensate flows along the same path as described earlier herein for the condensate. More specifically, the flush flows forward in respective manifolds 20 and 22 and lines 58 and 60 and exits through trap 64 and elbow 66.

Figure 4:
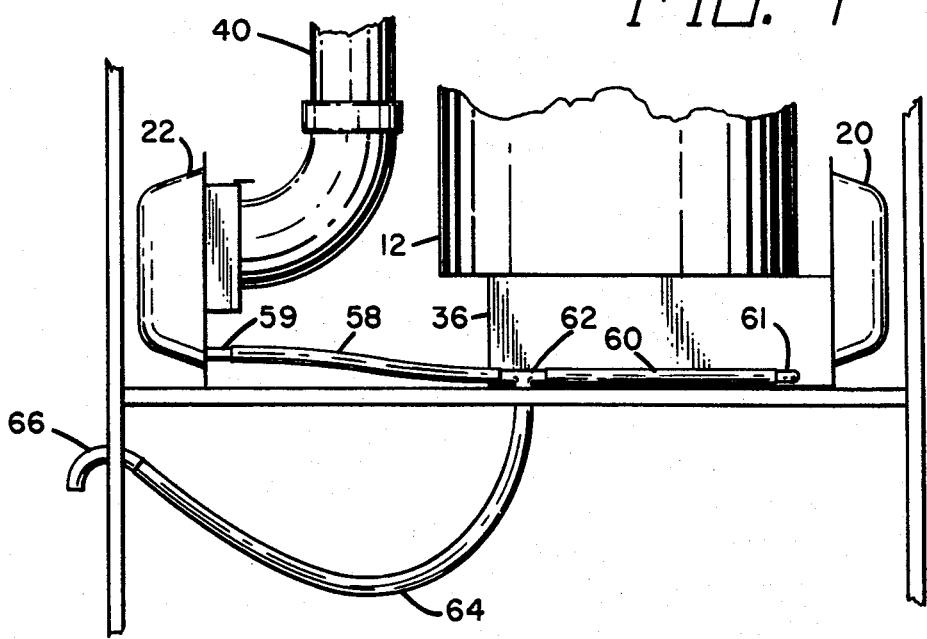
FIG. 4 is a front view of the central portion of the furnace of FIG. 1 showing draining apparatus.
Figure 6:
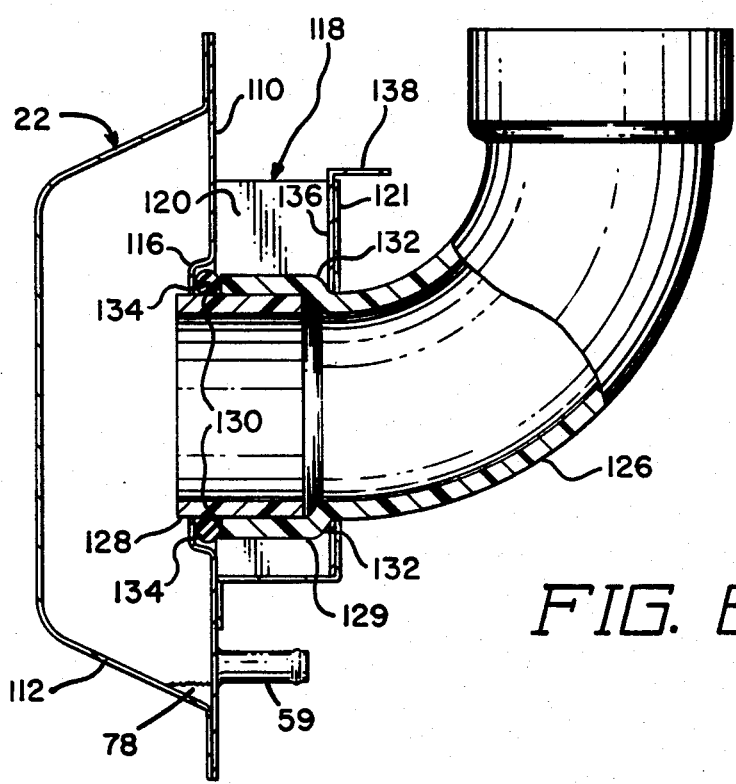
FIG. 6 is a front, partially broken away view of the connection between manifold 22 and flue 40.

As shown in FIGS. 4 and 6, lines 58 and 60 are connected to manifold 22 and conduit 36 at drains 59 and 61, respectively, slightly above their internal floors. This allows tap water 78 to remain standing in the manifolds at all times to provide two advantages. First, it insures that any condensate not washed out during the flushing process will be diluted by the remaining tap water. Second, it insures that any condensate flowing into the manifolds from recuperator 16 or vent pipe 40 after the flushing process has been completed will still be diluted.

Figure 7:
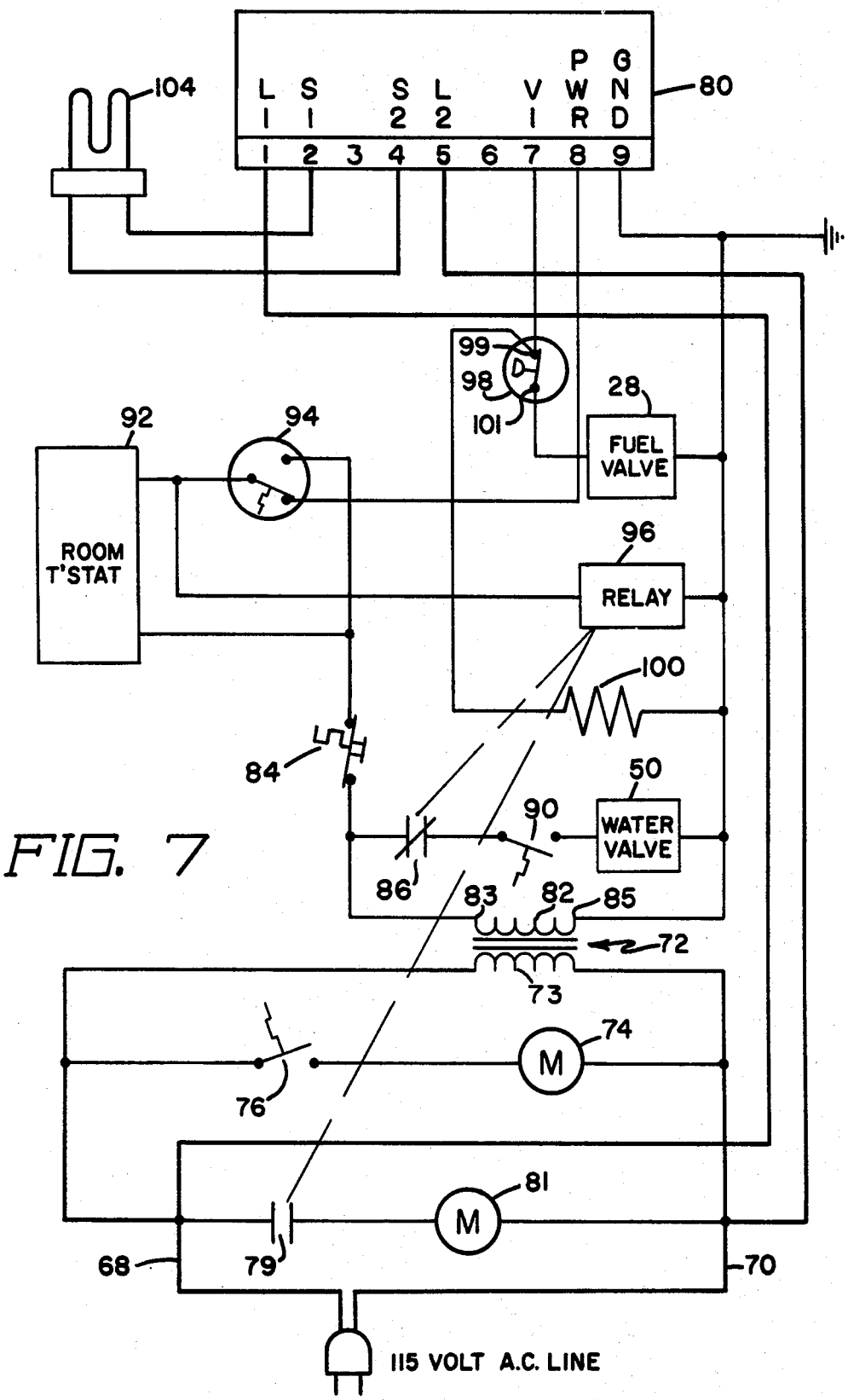
FIG. 7 is an illustrative electrical schematic for the controller of the recuperative furnace of FIG. 1.

Referring to FIG. 7, there is shown an illustrative electrical schematic which functions as the controller for the recuperative furnace of FIG. 1. Terminals 68 and 70 are connected to a standard household 115 volt ac source as shown. Accordingly, the ac voltage appears across the series of combustion air blower/pump motor 81 and combustion air blower/pump control contacts 79 which are normally open, the series of blower motor 74 and blower control contacts 76 which are temperature activated and normally open, the primary winding 73 of stepdown transformer 72, and terminals 1 and 5 of ignition control 80. The voltage across the secondary winding 82 of stepdown transformer 72 is reduced to approximately 24 volts. This secondary voltage appears across the series of water valve 50, normally closed contacts 86, and normally open temperature activated contacts 90. Further, side 83 of secondary winding 82 is connected through a secondary limiter 84 which consists of manually reset normally closed temperature activated contacts 84 to one terminal of room thermostat 92 and one switch terminal of water limiter 94 which consists of single pole double throw temperature activated contacts 94 as shown. The opposite switch terminal of water limiter 94 is connected to power input terminal 8 of ignition control 80. The second terminal of room thermostat 92 is an input to water limiter 94 and relay 96. Side 85 of secondary winding 82 is connected through blower control resistance heater 100 to terminal 99 of pressure switch 98, to the second terminal of relay 96, through fuel valve 28 to terminal 101 of pressure switch 98, and to grounded terminal 9 of ignition control 80. Terminal 7 of ignition control 80 is connected to terminal 99 of pressure switch 98. Further, ignitor 104 which was described earlier as a ceramic electronic ignitor tip is connected across terminals 2 and 4 of ignitor control 80. The components described herein with reference to FIG. 7 are conventional and well known in the art. For example, although the functions of ignition control 80 as described herein could be performed using a plurality of relays, it may be preferable to use a solid state device which is commercially available from Fenwal Inc., Division of Kidde, Inc., of Ashland, Mass., as catalogue order No. 05-212225-107. Also, ignitor 104 is commercially available as Model No. 201A from Norton Company of Milford, N.H.

Upon call for heat from room thermostat 92 as mentioned earlier herein, contacts internal thereto close allowing current to flow from secondary winding 82, through secondary limiter 84, thermostat 92, and water limiter 94 thereby energizing the power terminal of ignition control 80. Current also flows from room thermostat 92 activating relay 96. The activation of relay 96 opens normally closed contacts 86 and closes normally open contacts 79.

Closing contacts 79 completes the line voltage circuit through motor 81 that drives both the solution pump 42 and the combustion air blower 30. Accordingly, pump 42 begins to circulate the ethylene or propylene glycol and water mixture through the closed loop piping as described earlier herein. Also, blower 30 commences operation and creates a negative pressure at the outlet of fuel valve 28.

The energizing of ignition control 80 causes ignitor 104 to be energized by internally connecting pin 1 to pin 2 and pin 4 to pin 5 within ignition control 80.

After a time delay in which ignitor 104 heats to its specified ignition temperature, ignition control 80 opens fuel valve 28 and energizes blower control resistance heater 100 by internally providing power from pin 8 to pin 7. Pin 7 is connected to fuel valve 28 through pressure switch 98.

Activation of fuel valve 28 allows gas to be drawn into blower 30 for mixture with air which enters through apertures 34. The fuel and air mixture is then forced into module 12 where it is ignited by ignitor 104. Some desirable safety interlocks are not described herein because they form no part of the invention. The ignition and burning of the mixture provides heat which is transferred to the ethylene or propylene glycol and water mixture simultaneously flowing through module 12.

When blower control resistance heater 100 has reached a predetermined temperature, blower control contacts 76, which are in heat exchange relationship with heater 100, close to complete a line voltage circuit through blower motor 74. Motor 74 turns blower assembly 18 to move return air through furnace 10 as shown in FIG. 1. Cool air returning from the home or other enclosure to be heated is drawn into the blower assembly 18 from a return air duct, not shown. It typically may be at a temperature of 67° F.

The air is typically preheated or warmed by passage through tube and fin recuperative heat exchanger 16 to 77° F. The high efficiency of furnace 10 is in part a result of the recuperative process wherein flue gases are exhausted at a relative low temperature, such as, for example, in the range from 100° F. to 120° F. In non-recuperative furnaces, as is well known in the art, flue gases may be exhausted at temperatures on the order of 500° F. which substantially reduces the efficiency due to the lost heat. Not only is sensible heat extracted from the flue gases by recuperator 16, but also latent heat is recovered by the condensation of flue gases. Because the relatively cool return air passes over recuperative heat exchanger 16 first, recovery of latent heat of vaporization by condensation is enhanced. Heat is transferred to the air which is forced through recuperator 16 by blower 30.

After being preheated by recuperator 16, the air continues upward in channel 95 and through secondary heat exchanger 14. The temperature of the air may typically be elevated to approximately 136° F. by heat transferred from the heated glycol and water mixture flowing through the fin and tube construction of heat exchanger 14. From heat exchanger 14, the air may be forced through conventional duct work to the enclosure or home to be heated.

When room thermostat 92 is satisfied, the secondary voltage circuit through it is opened thereby removing power to ignition control 80 and relay 96. When power is removed from ignition control 80, ignitor 104 is deactivated and fuel valve 28 closes. When power is removed from relay 96, contacts 79 are opened and contacts 86 are closed. The opening of contacts 79 interupts the ac line voltage circuit across motor 81 thereby removing drive to solution pump 42 and combustion air blower 30. The closing of contacts 86 provide secondary voltage to the series of contacts 90 and water valve 50.

Contacts 90 which function as a thermal switch are physically located on conduit 36. When heated by the flow of combustion by-products through conduit 36 during operation of furnace 10, contacts 90 close. Therefore, when contacts 86 close by the deactivation of relay 96, water valve 50 is energized allowing tap water to flow through line 52 as previously described.

The flow of water through recuperator 16 continues until conduit 36 cools to a predetermined temperature and then temperature activated contacts 90 open to terminate the condensate flushing process.

Similarly, motor 74 continues to drive blower assembly 18 to force heated air into the home or other enclosure to be heated until blower control contacts 76 open. Blower control contacts 76 are in heat exchange relationship with secondary heat exchanger 14 and sense the temperature of exchanger 14. As with contacts 90, control contacts 76 open at a predetermined temperature.

Water limiter 94 and pressure switch 98 are safety devices designed to prevent furnace 10 from operating under unusual circumstances. Water limiter 94 is a commercially available thermal switch. It is positioned within module 12 as shown in FIG. 1. In the unlikely event of a loss of glycol and water mixture or other cause for overheating of module 12, water limiter 94 de-energizes ignition control 80 and, instead, only relay 96 is powered. This continues the circulation of cooling solution through module 12. Water limiter 94 automatically resets when a predetermined temperature is reached.

Switch 98 is a pressure activated switch located on conduit 36 as shown in FIG. 1. In the unlikely event of excessive back pressure within conduit 36 caused by a blocking of vent 40 or excessive condensate build up within manifold 22 or the like, switch 98 opens. This de-energizes fuel valve 28 thereby cutting off the flow of fuel for combustion into module 12.

Figure 8:
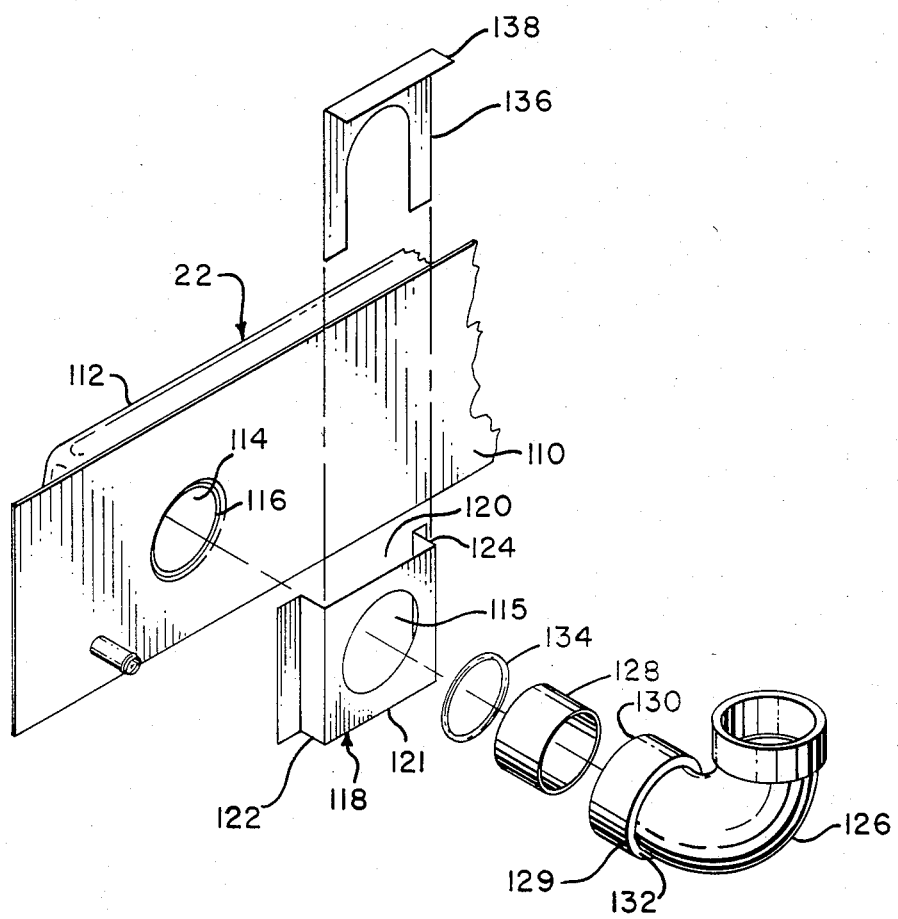
FIG. 8 is a perspective view of the separated parts forming the connection of the exhaust manifold and flue pipe as shown in FIG. 6.

Referring to FIG. 8, the parts of FIG. 6 are shown in separated perspective alignment for illustration. Exhaust manifold 22 is fabricated from stainless steel and is generally formed by flat sheet member 110 which is welded to an elongated pan section 112. At the back, sheet 110 is open to communicate with the exhaust ends of tubes 38 from the recuperative heat exchanger 16. This is similar construction to the input manifold 20 which communicates with the input to tubes 38. Manifolds 20 and 22 are welded to the respective sides of recuperative heat exchanger 16. At the front of sheet 110 is circular aperture 114, as shown, which has an inwardly directed step 116, as shown best in FIG. 6. Mounting bracket 118, which may preferably also be stainless steel, is spot welded to the outside of sheet member 110. As shown, mounting bracket 118 defines a parallelly spaced plate 121 forming vertical slot 120 between parallel leg members 122 and 124 which may be an inch or two in length. Plate 121 has a circular opening 115 that is larger than aperture 114 and both are axially aligned.

Pipe elbow 126, which is part of flue pipe 40, is fabricated from PVC and has a straight section of pipe 128 cemented in connector fitting 129 whereby pipe 128 extends outwardly from the fitting, as shown best in FIG. 6. Accordingly, after pipe elbow 126 and straight pipe section 128 are bonded together to form flue pipe 40, connector fitting 129 defines an annular protrusion having shoulders 130 and 132 which may be perpendicular or approximately perpendicular to pipe section 128. As will become apparent later herein, the length of connector fitting 129 approximately conforms to the spacing between plate 121 and sheet member 110.

In connecting the parts of FIG. 8 together to provide the operating configuration as shown in FIG. 6, flue pipe 40 is inserted through opening 115. The straight pipe section 128 extends through aperture 114 to secure the alignment in the plane of sheet member 110. Shoulder 130 of connector fitting 129 contacts O-ring 134 and preferably compresses it to form a substantially airtight seal between manifold 22 and flue pipe 40. O-ring 134 is made from a material which is resistant to the flue gas temperatures, such as, for example, 120° F. and also is resistant to corrosion by the mildly acidic environment. Certain plastics could be used for the O-ring but in addition to the characteristics already described, the material should exhibit elasticity so as to provide an effective seal. Once inserted through opening 115 and aperture 114 as described above, flue pipe 40 is secured in its position compressing O-ring 134 by sliding bifurcated retainer 136 downwardly in slot 120 until the bottom and portions of the inner sides contact shoulder 132 of connector fitting 129. Mounting bracket 118 prevents retainer 136 from moving in a direction away from manifold 22, and retainer 136 prevents flue pipe 40 from doing the same.

Still referring to FIGS. 6 and 8, the described apparatus provides a rigid connection of PCV flue pipe 40 to stainless steel manifold 22 without using any fasteners that penetrate to the interior of the manifold. Accordingly, there are no fastener parts subjected to the mildly acidic environment. Also, there are no additional crevices, cracks or holes in manifold 22 which could be subjected to corrosive attack. A second advantage of the coupling arrangement is that it provides a substantially airtight seal to prevent fumes and gases from leaking into the furnace room. Finally, bifurcated retainer 136 is provided with a handle 138 that can be used to remove the retainer by sliding it upward so as to separate flue pipe 40 from exhaust manifold 22. Accordingly, access can be gained for inspection and/or replacement of parts.

Although furnace 10 has been described with respect to specific details of certain preferred embodiments, it is not intended or required that such details limit the scope of the invention as set forth in the following claims. It will be apparent that various modifications and changes may be made by those skilled in the art without departing from the spirit of the invention as expressed in the accompanying claims. Hence, all matters shown and described are intended to be interpreted as illustrative and not in a limiting sense.

What is claimed is:

1. In combination:
   a recuperative heat exchanger for extracting heat from flue gases, said exchanger having a metallic exhaust manifold having a flat sheet wall with a circular aperture;
   a bracket having an external connection to said flat sheet wall, said bracket defining a plate parallelly spaced from said wall of said manifold, said plate having a circular opening coaxial to said aperture, said opening being larger than said aperture;
   a plastic pipe extending through said opening and into said manifold through said aperture, said pipe having an annular protrusion defining a first shoulder facing said manifold and a second shoulder facing away from said manifold;
   an O-ring positioned around said pipe, said O-ring being pressed between said first shoulder and said wall of said manifold to form a substantially airtight seal therebetween; and
   a bifurcated retainer removably inserted between said second shoulder and said plate, said retainer engaging said second shoulder to prevent motion of said pipe away from said manifold.

2. The combination in accordance with claim 1 wherein said heat exchanger comprises tubes surrounded by fins, the exhaust end of said tubes communicating with said exhaust manifold.

3. The combination in accordance with claim 1 wherein said external connection of said bracket to said wall defines spot welding.

4. The combination in accordance with claim 1 wherein said pipe is fabricated from PVC.

5. The combination in accordance with claim 1 wherein said aperture has an inwardly directed step, said O-ring being seated in said step.

6. An exhaust assembly for a recuperative furnace, comprising:
   a tube and fin recuperative heat exchanger for extracting heat from the products of combustion and for recovering latent heat of vaporization from said products of combustion by condensation within said tubes;
   a metallic manifold coupled to the exhaust ends of said tubes of said recuperative heat exchanger, said manifold having a substantially flat sheet metal wall with an inwardly stepped circular aperture;
   an elastic O-ring seated in the step of said stepped circular aperture;
   a bracket having an external connection to said wall, said bracket defining a plate parallelly spaced from said wall of said manifold, said plate having an aperture coaxial with said aperture in said surface of said manifold;
   a plastic pipe extending through said apertures in said plate and said manifold, said pipe having an annular protrusion defining a first shoulder facing said manifold and a second shoulder facing away from said manifold, said first shoulder being pressed against said O-ring wherein a substantially airtight seal is formed; and
   a bifurcated retainer removably inserted between said plate and said second shoulder, said retainer engaging said second shoulder preventing said pipe from moving in a perpendicular direction away from said manifold.

7. The assembly recited in claim 6 wherein said pipe is PVC.

8. The assembly recited in claim 6 wherein said O-ring is compressed between said wall and said first shoulder.

9. The method of connecting a plastic flue pipe to a flat sheet metal wall of a manifold of a recuperative heat exchanger of a residential furnace, comprising the steps of:
   inserting said plastic flue pipe through a first circular aperture in a bracket plate externally connected to and parallelly spaced from said wall of said manifold and through a second circular aperture in said wall, said first and second apertures being coaxial, said pipe having an annular protrusion having a circumference larger than said second aperture but smaller than said first aperture, said protrusion defining a first shoulder facing said manifold and a second shoulder facing away from said manifold;
   pressing said pipe inwardly towards said manifold to compress an elastic O-ring between said first shoulder and said wall of said manifold to form an airtight seal; and
   inserting a bifurcated retainer between said plate and said surface of said manifold, said retainer engaging said second shoulder to prevent movement of said pipe in a direction perpendicular away from said manifold.

* * * * *